Nov. 22, 1960  J. A. WARR, JR  2,960,739
SAFETY LINE CLAMP FOR DERRICKMEN
Filed March 31, 1958  2 Sheets-Sheet 1
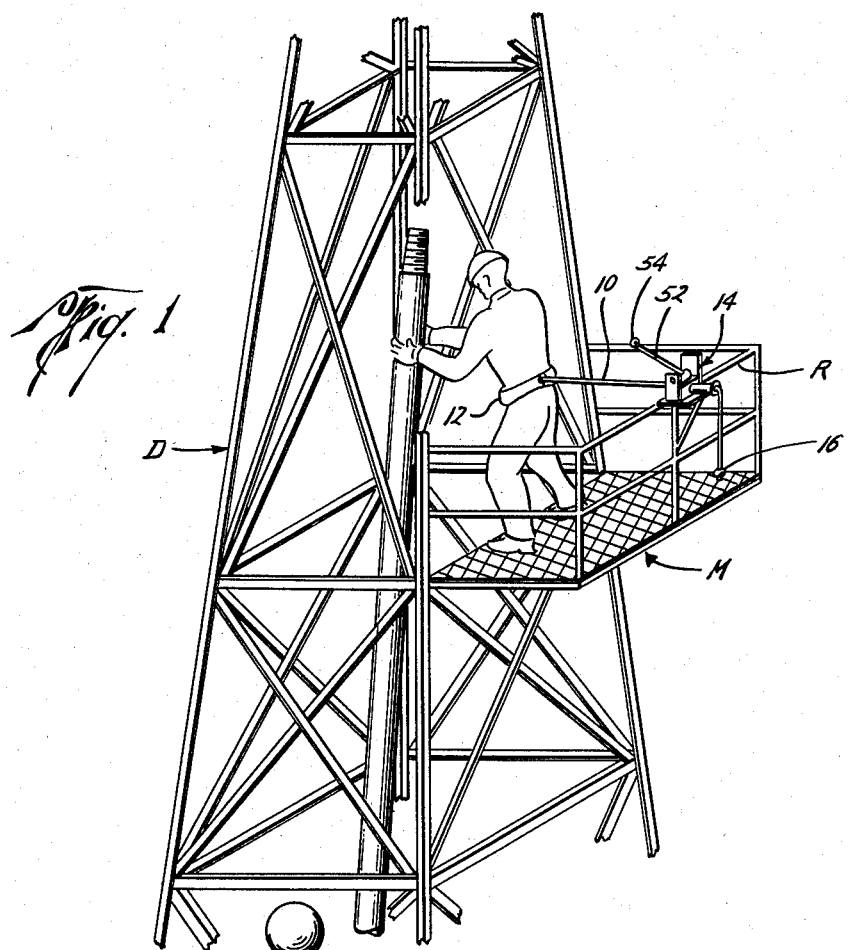
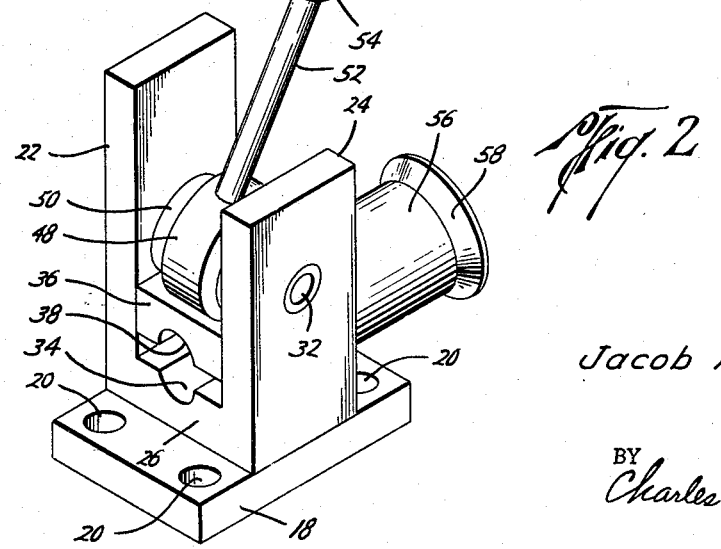
Jacob A. Warr, Jr.
INVENTOR.
BY
Charles E. Lightfoot
ATTORNEY

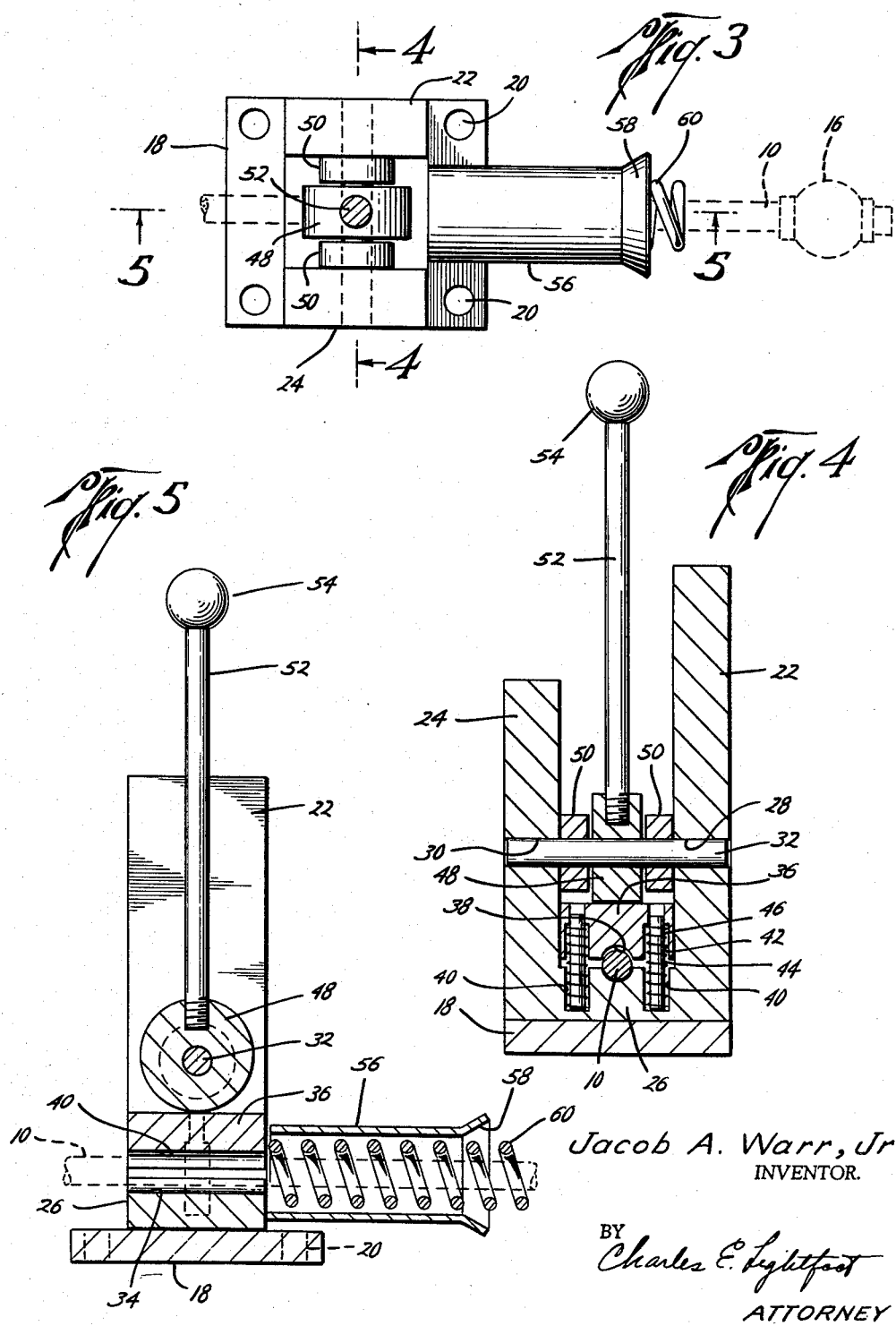

United States Patent Office 2,960,739
Patented Nov. 22, 1960

2,960,739
SAFETY LINE CLAMP FOR DERRICKMEN
Jacob A. Warr, Jr., 5549 McCullock Circle, Houston, Tex.
Filed Mar. 31, 1958, Ser. No. 725,342
2 Claims. (Cl. 24—134)

This invention relates to line clamping mechanism and more particularly to a line clamp for use with safety lines for derrickmen or others whereby such a line may be quickly adjusted for length to permit freedom of movement of the user while affording a maximum of safety.

The invention is capable of general use as a cable holding and releasing device and finds particular application in connection with derrick equipment of the type used in oil fields and other locations where derrickmen or other persons are required to work at an elevation on such equipment and there is danger of falling.

In well drilling operations it is customary to make use of derricks which are provided with working platforms called "monkey boards" located at various elevations above the ground and upon which derrickmen may stand while manipulating sections of drill pipe, tubing, and the like, to properly locate the same for connection into or disconnection from a drilling or tubing string. While carrying on such operations the derrickman must often lean far out from the work platform to properly manipulate the pipe and is thus exposed to great danger of falling, so that it is necessary to provide safety belt and line means worn by the derrickman which is anchored at some convenient location to hold the derrickman against falling in the event that he should lose his balance or slip.

Safety line devices for this purpose must be designed to permit sufficient freedom of movement for the derrickman to allow him to move about at the same time effectively support the derrickman to prevent him from slipping or losing his balance. Safety line devices, as heretofore commonly constructed, are not usually satisfactory because of the difficulty of providing means for permitting the derrickman to move freely about to the various positions he must assume and also to effectively support the derrickman against falling from any such position.

The present invention has for an important object the provision of safety line mechanism which is operable by the derrickman to permit him to occupy any desired position on the monkey board yet which will effectively support the derrickman in the event that he should fall.

Another object of the invention is the provision in safety line mechanism of means whereby the effective length of the line may be quickly and easily adjusted to support the derrickman in any position which he may desire to assume.

A further object of the invention is to provide a safety line clamp which is easily and quickly operated to clamp or release the safety line and embodying means for preventing slipping of the line when the clamp is in line clamping position.

Another object of the invention is the provision of safety line clamping mechanism which is operable to permit the effective length of the line to be adjusted and which includes means for holding the line and absorbing the shock of the sudden check of the running out of the line in the event of accidental releasing of the line.

A further object of the invention is to provide safety line clamping and releasing mechanism which is of simple design and rugged construction, capable of withstanding the hard usage to which such equipment is likely to be subjected.

The above and other important objects and advantages of the invention may best be understood from the following detailed description, constituting a specification of the invention, when considered in conjunction with the annexed drawings, wherein—

Figure 1 is a perspective view, on a reduced scale, illustrating a preferred embodiment of the invention, showing the same applied to a derrick and the manner in which the device is used and operated;

Figure 2 is a perspective view of the line clamp of the invention, separated from the supporting structure therefor and with the safety line removed;

Figure 3 is a top plan view of the line clamp of the invention as illustrated in Figure 2, the safety line being shown therein in dotted lines with the clamp in line releasing position;

Figure 4 is a cross-sectional view, taken along the line 4—4 of Figure 3, looking in the direction indicated by the arrows; and Figure 5 is a cross-sectional view taken along the line 5—5 of Figure 3, looking in the direction indicated by the arrows.

Referring now to the drawings in greater detail the invention is illustrated herein in connection with its use on a derrick D of usual construction, such as those used in the drilling and production of oil wells, having a work platform or monkey board M supported thereon at an elevated location to permit ready access to the interior of the derrick to enable sections of pipe or tubing to be manipulated therein and provided with a safety railing R.

In the use of equipment of this kind a derrickman stands on the monkey board M in position to manipulate the sections of pipe to position them to be coupled into or disconnected from the drilling string or tubing string of the well located at the bottom of the derrick. The derrickman must often lean far into the interior of the derrick from the monkey board to properly position the pipe, thus exposing himself to the danger of slipping or losing his balance and falling, and it is for the purpose of preventing the occurrence of accidents of this kind that the present invention is designed.

The safety line mechanism of the invention comprises a safety line 10 which is attached at one end to a belt, harness or other suitable device 12 worn by the derrickman, and a line clamping device, generally indicated at 14, attached to the railing R and through which the safety line 10 extends.

The safety line 10 preferably takes the form of a steel cable connected at one end in any suitable manner to the belt 12, as by means of a swivel, snap hook, or the like, not shown, and having at its other end a stop member 16 which may be clamped, welded or otherwise secured to the cable.

The safety line clamp 14 is formed with a base portion 18 in the form of a plate having suitable perforations 20 through which the arms of U-bolts or the like, not shown, may be extended, which bolts may extend about a rail of the railing R or other suitable support and are provided with nuts whereby the clamp may be securely anchored to the railing. The clamp has a portion of generally U-shape extending upwardly from the base 18, and which is formed with upright arms 22 and 24 connected at their lower ends by a bottom web 26. The side arms 22 and 24 are provided with horizontally aligned bearing openings 28 and 30 through which a shaft 32 extends upon which a clamp actuating cam is mounted.

The bottom web 26 has a cable receiving groove 34 extending across its upper face and a cable clamping block or plate 36 is movably positioned for vertical movement between the arms 22 and 24 above the web 26 and is provided with a downwardly facing cable groove 38 opposite the groove 34. The web 26 may also be formed with upwardly opening recesses 40 on each side of the groove 34 and the block 36 has downwardly opening recess 42 in vertical alignment with the recesses 40. Downwardly extending guide pins 44 are carried by the plate or block 36 which pins extend through the recesses 42 and are movably received in the recesses 40. Within the recesses 42 the pins 44 are surrounded by coil springs 46 which bear at their upper ends on the bottoms of the recesses 42 of block 36 and at their lower ends on the upper face of the web 26 around the upper ends of the recesses 40 to urge the block upwardly away from the web.

A clamp actuating cam 48 is mounted for rotation on the shaft 32 between spacer elements 50 located between the arms 22 and 24 and this cam is provided with an actuating lever 52 by which the cam may be rotated in either direction. The cam is of cylindrical shape and is mounted eccentrically on the shaft 32 so that the cam bears at its periphery on the upper face of the block 36 to move the block toward the web 26 when the lever 52 is moved in either direction out of a substantially vertical position. The lever 52 may be weighted at its upper end by a knob 54 to cause the lever to remain in a position with the block 36 and web 26 in clamping engagement with the cable 10 until the lever is moved to its cable releasing position.

Buffer or shock absorbing mechanism is provided for the cable 10, which may conveniently take the form of a tubular housing 56 attached at one end to the arms 22 and 24 and extending horizontally outwardly in substantially axial alignment with the grooves 34 and 38. The outer end portion of the housing may be outwardly flared as indicated at 58. Within the housing 56 a buffer element such as a coil spring 60 is positioned about the cable 10, in position to be engaged by the stop member 16 on the end of the cable 10 to prevent the cable from slipping entirely out of the clamp and to cushion the shock in the event that the derrickman should fall with the clamp in released condition pulling the cable to the limit of its movement through the clamp.

In making use of the invention, constructed as described above, the base 18 is secured to a suitable support, such as the railing R by means of U-bolts or the like, not shown, as previously described, the clamping mechanism extending upwardly from the railing with the cable 10 positioned in the groove 34 of the web 26. The cable is then attached to the belt or harness 12 worn by the derrickman.

By pulling the cable through the clamp mechanism to the desired extent and operating the lever 52 to move the cam 48 in either direction from the vertical or releasing position, the block 36 may be moved downwardly against the springs 46 to clamp the cable securely between the web and block in the grooves 34 and 40. With the cable so extended and clamped the derrickman may move about on the monkey board without danger of falling. Should a greater length of cable be needed to permit more freedom of movement of the derrickman the clamp may be released by actuating the lever 52 to releasing position, whereupon the length of the cable may be adjusted as desired and the lever again moved to clamping position to reclamp the cable.

In the event that the derrickman should slip or lose his balance and fall while the clamping mechanism is released, or if the lever 52 should be accidently moved to releasing position, then the cable may run out to the limit of its movement in the clamping mechanism and the stop 16 will engage the spring 60 to prevent the cable from slipping entirely through the mechanism. The engagement of the stop 16 with the spring 60 will also serve to cushion any shock due to the jerking of the cable in the event the derrickman should fall with the clamping mechanism released.

During clamping and unclamping movement of the block 36 the pins 44 serve to hold the block in proper alignment between the arms 22 and 24 to prevent jamming or sticking of the mechanism.

It will thus be seen that the invention provides safety line clamping mechanism which is of simple design and economical construction and by the use of which maximum freedom of movement and safety is provided for the user.

The invention has been disclosed herein in connection with a certain specific embodiment of the same, but it will be understood that this is intended by way of illustration only, and that numerous changes can be made in the construction and manner of operation of the parts within the spirit of the invention and the scope of the appended claims.

Having thus clearly shown and described the invention what is claimed as new and desired to secure by Letters Patent is:

1. Safety line equipment for use with a cable adapted to be connected at one end to a person to be supported by the cable comprising, a base member adapted to be connected to a support, a U-shaped element whose bottom portion is attached to and whose arms extend upwardly away from the member, a clamping plate movably positioned between the arms of the element for movement toward and away from the bottom of the element, said element and plate each having a groove therein located between the arms of the element and through which the cable is extended between the element and plate, means for moving the plate toward the bottom of the element to clampingly engage the cable between the element and plate in the grooves, yieldable means positioned for coaction with the element and plate to yieldingly urge the plate away from the bottom of the element, an elongated coil spring surrounding the cable and positioned with one end thereof in engagement with said plate and element and whose longitudinal axis extends away from the plate and element in the direction of said grooves, and means on the cable positioned for engagement with the other end of said spring to yieldingly arrest longitudinal movement of the cable in one direction through said grooves.

2. Safety line equipment for use with a cable adapted to be connected at one end to a person to be supported by the cable comprising, a base member adapted to be connected to a support, a U-shaped element whose bottom is attached to the member with the arms of the U extending away from the member, a clamping plate movably positioned between the arms of the element for movement toward and away from the bottom of the element, said element and plate each having a groove therein located between the arms of the element and through which the cable is extended between the element and plate, means for moving the plate toward the bottom of the element to clampingly engage the cable between the element and plate in the grooves, a tubular housing on the element in coaxial alignment with and extending beyond one end of the groove of the element, yieldable means positioned for coaction with the element and plate to yieldingly urge the plate away from the bottom of the element, resilient means in said housing through which the cable is axially extended and means on the cable positioned for engagement with said resilient means to limit longitudinal movement of the cable in one direction through said grooves.

(References on following page)

References Cited in the file of this patent

UNITED STATES PATENTS

| | | |
|---|---|---|
| 78,794 | Ellis et al. | June 9, 1868 |
| 382,574 | Westbrook | May 8, 1888 |
| 461,998 | Combs | Oct. 27, 1891 |
| 626,812 | Kirschenhofer | June 13, 1899 |
| 697,404 | Grundy | Apr. 8, 1902 |
| 1,032,294 | Nothaft et al. | July 9, 1912 |
| 1,049,642 | Baesel | Jan. 7, 1913 |
| 1,084,379 | Wile | Jan. 13, 1914 |
| 1,300,040 | Stuart | Apr. 8, 1919 |
| 1,944,603 | Hecker | Jan. 23, 1934 |
| 2,607,058 | Ferguson | Aug. 19, 1952 |
| 2,796,953 | Becker | June 25, 1957 |